United States Patent
Liao

(10) Patent No.: US 12,092,153 B2
(45) Date of Patent: Sep. 17, 2024

(54) ANGULARLY ADJUSTABLE STEERING JOINT

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 1061 days.

(21) Appl. No.: 16/938,477

(22) Filed: Jul. 24, 2020

(65) Prior Publication Data
US 2022/0026013 A1    Jan. 27, 2022

(51) Int. Cl.
*F16C 11/04*    (2006.01)
*F16B 7/04*    (2006.01)
*F16C 11/10*    (2006.01)
*F16M 11/10*    (2006.01)

(52) U.S. Cl.
CPC ............ *F16C 11/103* (2013.01); *F16B 7/048* (2013.01); *F16C 11/045* (2013.01); *F16M 11/10* (2013.01); *F16M 2200/022* (2013.01); *Y10T 403/32418* (2015.01)

(58) Field of Classification Search
CPC .......... F16B 7/044; F16B 7/048; F16C 11/04; F16C 11/045; F16C 11/10; F16C 11/103; F16M 11/06; F16M 11/10; F16M 11/105; F16M 2200/022; Y10T 403/32114; Y10T 403/32188; Y10T 403/32254; Y10T 403/32262; Y10T 403/32319; Y10T 403/32418; Y10T 403/32426; Y10T 403/32951; Y10T 403/32959
USPC ........ 403/188, 195, 196, 233, 234, 235, 236
See application file for complete search history.

(56) References Cited

U.S. PATENT DOCUMENTS

| | | | | |
|---|---|---|---|---|
| 452,375 | A | * | 5/1891 | Helmond ................ A47L 13/24 403/66 |
| 2,370,748 | A | * | 3/1945 | O'Donnell ............ F16B 7/0493 24/329 |
| 3,545,710 | A | * | 12/1970 | Mooney ............. F16M 11/2014 248/183.2 |
| 3,924,083 | A | * | 12/1975 | Hagey ...................... H04R 1/08 248/596 |
| 4,744,690 | A | * | 5/1988 | Hsieh .................... F16B 7/1418 403/104 |
| 4,773,621 | A | * | 9/1988 | Gebhardt ................ F21V 21/14 248/122.1 |
| 5,154,382 | A | * | 10/1992 | Hoshino ................ F16M 11/10 248/185.1 |

(Continued)

*Primary Examiner* — Josh Skroupa
*Assistant Examiner* — Kevin J Baynes
(74) *Attorney, Agent, or Firm* — Muncy, Geissler, Olds & Lowe, P.C.

(57) ABSTRACT

The invention discloses a steering joint for connecting a bottom pipe and a supporting pipe, which comprises a base, a rotary seat and a locking piece. The base comprises a sleeve portion connected with the bottom pipe and a first pivoting plate comprising a guide groove. The rotary seat comprises a clamp for clamping the supporting pipe and a second pivoting plate comprising a through hole. The first pivoting plate and the second pivoting plate are pivoted together at a pivoting point, when the first pivoting plate and the second pivoting plate rotate relatively, the through hole is kept align to the guide groove. The locking piece penetrates through the through hole and the guide groove and clamps and fixes the first pivoting plate and the second pivoting plate. Through that a certain distance exists between the locking piece and the pivoting point, the load carrying capacity is increased.

8 Claims, 4 Drawing Sheets

(56) References Cited

U.S. PATENT DOCUMENTS

| | | | | |
|---|---|---|---|---|
| 5,449,138 | A | * | 9/1995 | Ciancio .................. F21V 21/26 403/53 |
| 6,312,184 | B1 | * | 11/2001 | Hoshino ............... F16B 7/1418 403/373 |
| 6,520,574 | B1 | * | 2/2003 | Huang ..................... A47C 7/66 248/515 |
| 6,536,720 | B1 | * | 3/2003 | Yu .......................... F16M 11/10 248/185.1 |
| 6,814,332 | B2 | * | 11/2004 | Eason ............... F16M 11/2014 381/386 |
| 7,256,338 | B2 | * | 8/2007 | Hsieh .................... G10D 13/10 84/421 |
| 9,310,021 | B2 | | 4/2016 | Hennessey |
| 11,293,586 | B1 | * | 4/2022 | Kallas ..................... H04R 1/08 |
| 2002/0064417 | A1 | * | 5/2002 | Feng ..................... B62K 3/002 403/102 |
| 2006/0249007 | A1 | * | 11/2006 | Hsieh .................... F16C 11/103 84/421 |
| 2010/0224750 | A1 | * | 9/2010 | Webber ................. F16M 11/10 248/288.11 |
| 2016/0053934 | A1 | * | 2/2016 | Hennessey ............. F16M 11/10 248/124.2 |

* cited by examiner

ANGULARLY ADJUSTABLE STEERING JOINT

FIELD OF THE INVENTION

The invention relates to a steering joint, in particular to an angularly adjustable steering joint.

BACKGROUND OF THE INVENTION

In performing musical instruments or stage performance, a variety of musical instruments and acousto-optic devices should be provided to support musical instruments, lighting devices, etc. to provide lighting or special effects. Different performers have different habits and crafts, so the music score, musical instruments, acousto-optic and other devices need to be placed in the position and angle according to personal habits. It is known to use a steering joint as disclosed in U.S. Pat. No. 9,310,021 B2, which has a lower joint and an upper joint, and the lower joint and the upper joint can be connected to a rod body respectively. After a tightening knob of the steering joint is rotated and loosened, the upper joint and the lower joint can be separated to rotate and change the relative angles of the upper joint and the lower joint, so that the relative inclination angle of the two rod bodies can be adjusted, and therefore equipment arranged on the rod body can be adjusted to the required placing angle.

However, in the conventional steering joint, the pivoting points of the upper and lower joints and the locking point of the tightening knob are located at the same position, so that when the weight of the equipment provided on the rod body is heavy, the tightening knob will bear a considerable rotation moment and can be loosened. Therefore, the upper joint and the lower joint must have a sawtooth-shaped anti-slip structure which is correspondingly clamped, so that when the angle is adjusted, the problem of minimum angle adjustment can be caused, and when the operation is wrong, it is easy for the tooth-shaped anti-slip structure to collapse and loosen so that it cannot be correspondingly clamped.

SUMMARY OF THE INVENTION

Accordingly, it is a primary object of the present invention to disclose a steering joint that meets the need for angular adjustment.

To achieve the above object, the present invention provides a steering joint for connecting a bottom pipe and a support pipe. The steering joint comprises a base, a rotary base and a locking piece. The base comprises a sleeve portion and a first pivot plate, wherein the sleeve portion comprises a sleeve space which is opened downward and is sleeved with the bottom pipe, and the first pivot plate is provided with a guide groove. The rotary base comprises a clamp for clamping the support pipe and a second pivot plate which is provided with a through hole, wherein the first pivot plate and the second pivot plate are pivoted together at a pivot point, and when the first pivot plate and the second pivot plate rotating relatively, the through hole is kept to align to the guide groove. The locking piece penetrates through the through hole and the guide groove to clamp and fix the first pivot plate and the second pivot plate, so that the first pivot plate and the second pivot plate cannot rotate relatively.

Accordingly, in the present application, the base and the rotary seat are respectively connected with the bottom pipe and the supporting pipe, and the base and the rotary seat can relatively rotate through the pivoting of the first pivoting plate and the second pivoting plate. The pivoting point and the clamping and fixing position of the locking piece are different, namely a certain distance exists between the pivoting point and the clamping and fixing position of the locking piece. Compared with the conventional situation with the pivoting point which is also the clamping and fixing position, the steering joint provided by the invention can have higher load carrying capacity, so that the requirement of angular adjustment can be met in the present invention without arranging a sawtooth-shaped anti-skid structure.

DETAILED DESCRIPTION OF THE PREFERRED EMBODIMENTS

The technical summary, features and efficacy of the present invention will be clear from the following detailed description of the preferred embodiments, taken in conjunction with the accompanying drawings.

Figure 1:
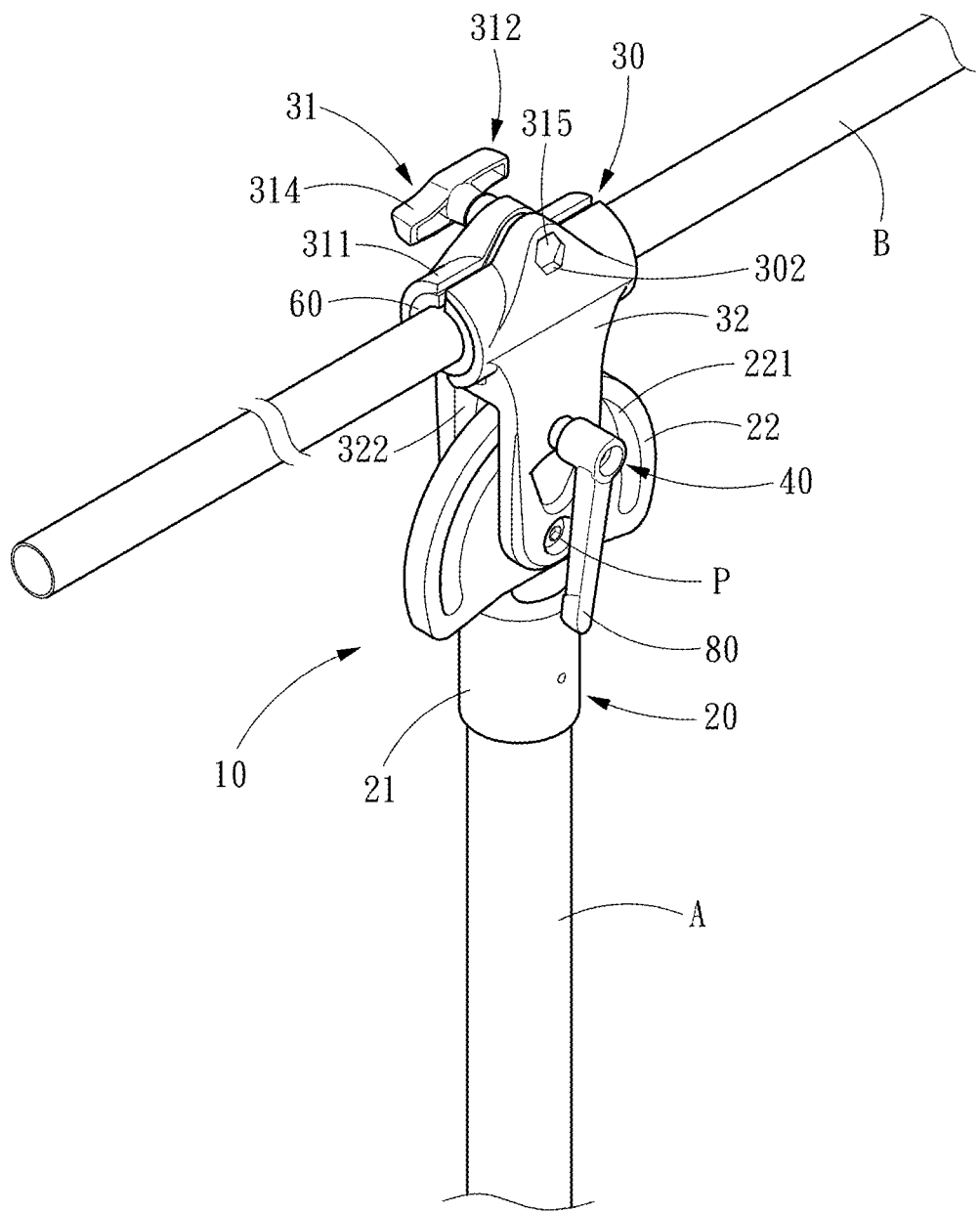
FIG. 1 is a structural view of a steering joint of the present invention.
Figure 2:
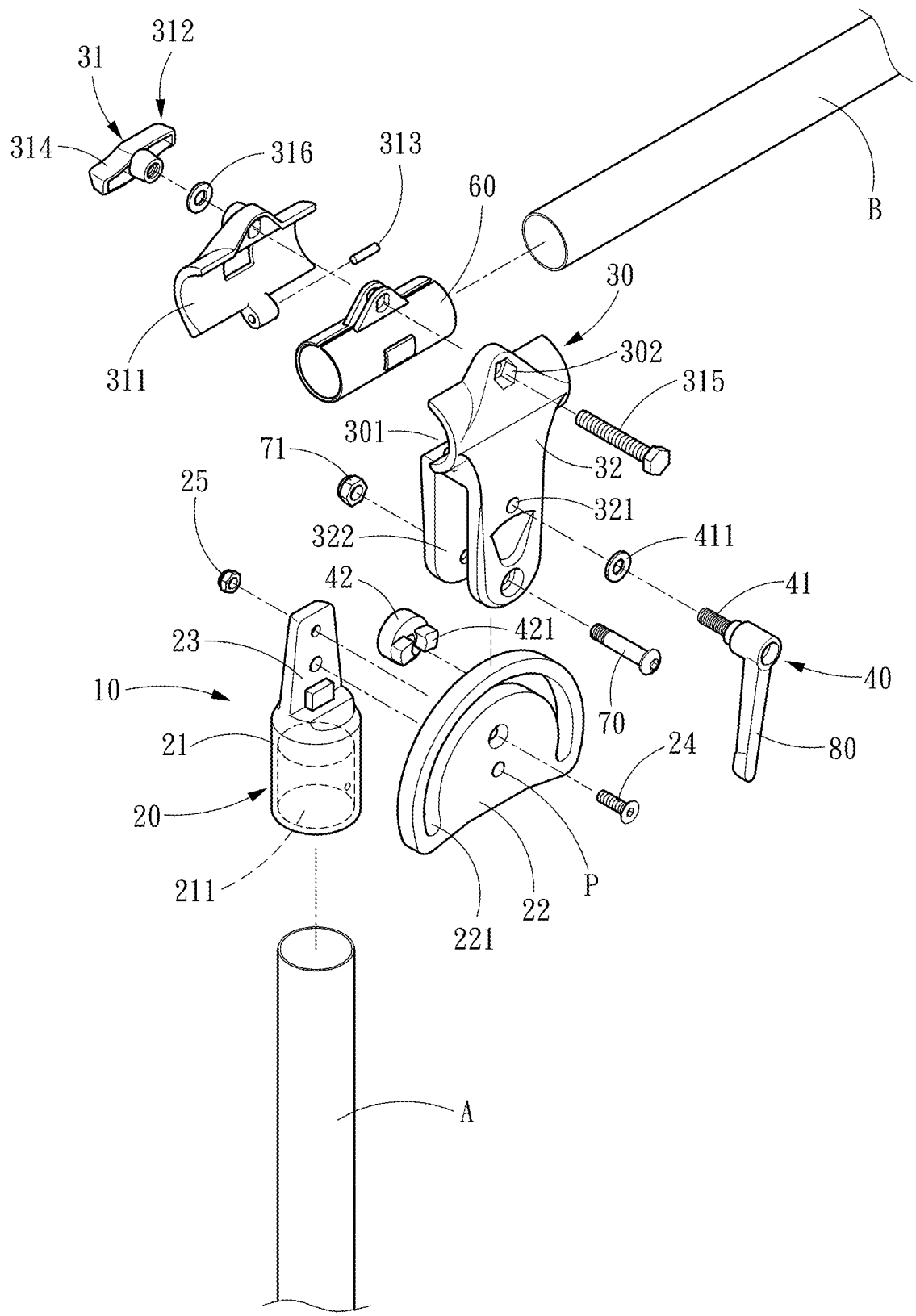
FIG. 2 is a structural exploded view of the steering joint of the present invention.

Referring to FIGS. 1 and 2, the present invention provides a steering joint 10 for connecting a bottom pipe A and a support pipe B. The steering joint 10 comprises a base 20, a rotary base 30 and a locking piece 40, wherein the base 20 comprises a sleeve portion 21 and a first pivot plate 22, and the sleeve portion 21 includes a sleeve space 211 which is opened downward and is sleeved with the bottom pipe A. The first pivot plate 22 is provided with a guide groove 221.

In one embodiment, the bottom pipe A is inserted directly into the sleeve space 211, so that the bottom pipe A is fixed on the sleeve portion 21, and the base 20 is connected to the bottom pipe A.

In addition, the base 20 extends out of a locking plate 23 integrally, the first pivot plate 22 is fixed on the locking plate 23 through locking a fixing bolt 24 and a fixing nut 25, so that the first pivot plate 22 and the base 20 are designed separately to reduce the difficulty of manufacturing, and the first pivoting plate 22 and the base 20 can be independently replaced and maintained to reduce the cost.

The rotary base 30 is provided with a clamp 31 for clamping the support pipe B and a second pivot plate 32, the second pivot plate 32 is provided with a through hole 321. The first pivot plate 22 and the second pivot plate 32 are pivoted together at a pivoting point P, and when the first pivot plate 22 and the second pivot plate 32 rotate relatively, the through hole 321 is kept to align to the guide groove 221 directly.

In one embodiment, the rotary base 30 may comprise an insertion space 301 for inserting the support pipe B. The clamp 31 comprises an arc plate 311 and a tightening piece 312, wherein the arc plate 311 is adjacent to the insertion space 301, and the arc plate 311 is pivoted on the rotary base 30 through a latch 313. The tightening piece 312 comprises a knob 314 and a bolt 315, wherein the bolt 315 penetrates through the rotary base 30 and the arc plate 311 to screw on the knob 314. The rotary base 30 includes a recess 302 which is provided with the bolt 315 to press against and block the bolt 315 from rotating. The knob 314 is rotatable to press against the arc plate 311 to transversely penetrate into the insertion space 301 so that the arc plate 311 clamps the support pipe B. A circular washer 316 is disposed between the knob 314 and the arc plate 311 to assist the knob 314 in pressing against the arc plate 311. Also, in order to avoid scratching of the support pipe B, the present invention may further comprise a pipe bushing 60 to provide a hardness which is lower than a hardness of the support pipe B, and the support pipe B is placed in the insertion space 301 at an interval of the pipe bushing 60.

In addition, the second pivot plate 32 may be U-shaped, the second pivot plate 32 forms a gap space 322, the first pivot plate 22 is placed in the gap space 322, and the first pivot plate 22 and the second pivot plate 32 are pivoted together at the pivot point P by locking a pivot screw 70 and a pivot nut 71.

The locking piece 40 penetrates through the through hole 321 and the guide groove 221 to clamp and fix the first pivot plate 22 and the second pivot plate 32 so that the first pivot plate 22 and the second pivot plate 32 cannot rotate relatively. In one embodiment, the locking piece 40 comprises a locking bolt 41 and a slide screw nut 42, wherein the slide screw nut 42 comprises a convex portion 421, the convex portion 421 can slide on the guide groove 221, the slide screw nut 42 is placed in the gap space 322 and presses against the first pivot plate 22, and the locking bolt 41 penetrates through the through hole 321 and the guide groove 221 and can press against the second pivot plate 32 through a circular locking gasket 411. The locking bolt 41 is screwed on the slide screw nut 42 to clamp and fix the first pivot plate 22 and the second pivot plate 32. The locking bolt 41 in the present invention can further comprise a rotary shifting lever 80 to be fixed on the locking bolt 41, so that a user can conveniently rotate the locking bolt 41.

Figure 3A:
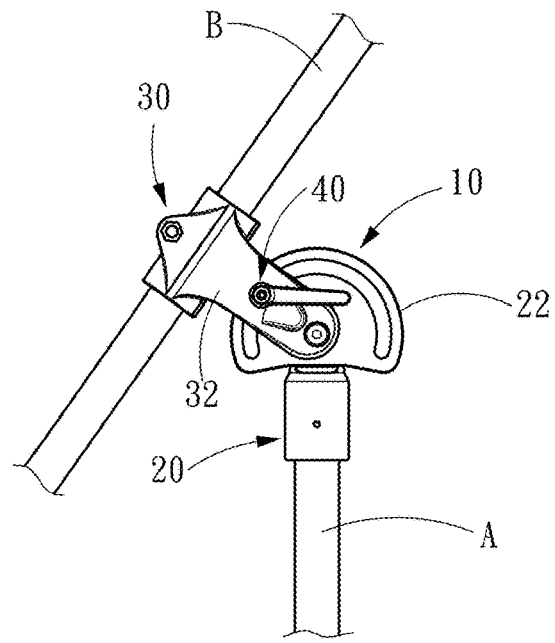
FIG. 3A is a first schematic view showing the angle adjustment of the present invention.
Figure 3B:
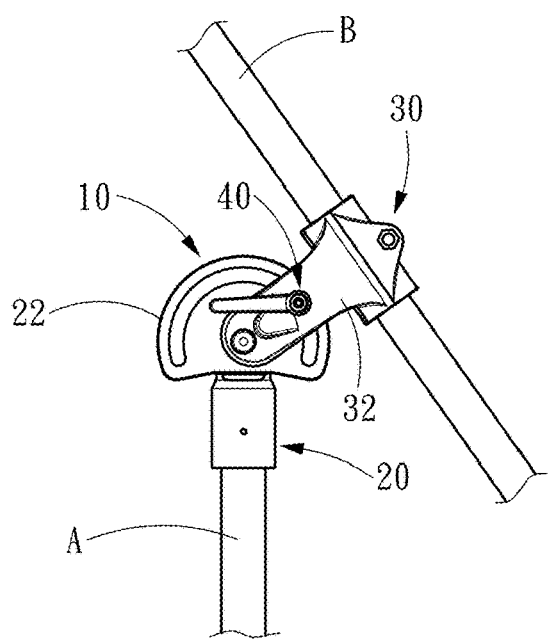
FIG. 3B is a second schematic view showing the angle adjustment of the present invention.

With reference to FIGS. 3A and 3B, as shown, as long as the user simply releases the locking piece 40 of the steering joint 10, the first pivot plate 22 can be rotated relatively to the second pivot plate 32 to freely adjust an angle of the rotary base 30 which is relative to the base 20, the locking piece 40 is re-locked when a desired angle is adjusted by the user. The relative positions of the first pivot plate 22 and the second pivot plate 32 can be fixed again, that is, the angle of the rotary base 30 relative to the base 20 can be fixed.

Figure 4:
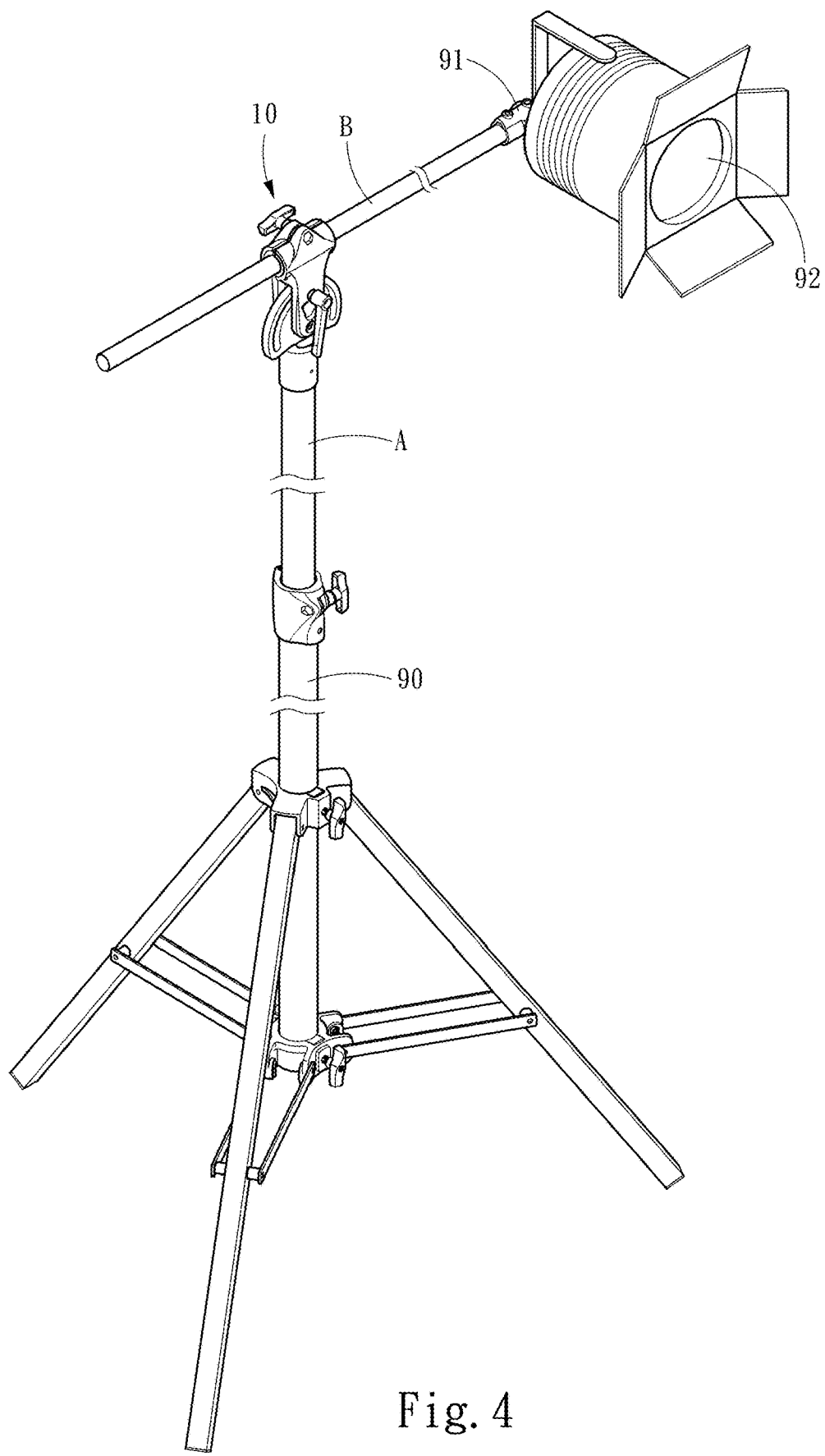
FIG. 4 is a schematic view illustrating mounting and use of the present invention.

With reference to FIG. 4, the steering joint 10 of the present invention can connect the bottom pipe A and the support pipe B, wherein the bottom pipe A can be assembled on a monopod 90, and the support pipe B can be provided with a lamplight rod 91, wherein a light 92 is hung on the lamplight rod 91, and the light 92 meets lighting requirements after being lighted up.

As described above, the invention comprises at least the following characteristics:
1. The pivot point is different from a position where the locking piece is clamped and fixed, so that a certain distance exists between the pivot point and the position where the locking piece is clamped and fixed. Compared with a conventional pivoting point which is located at the position for clamping and fixing, the steering joint provided by the invention can have higher load bearing capacity, and therefore the present invention meets the requirement of angular adjustment without arranging a zigzag-shaped anti-skid structure.

2. The first pivot plate and the base are separately designed, the first pivot plate and the base can be independently replaced or maintained, so that the use cost can be reduced.
3. Through the arrangement of the pipe bushing, scratching of the support pipe can be avoided.
4. The second pivot plate is U-shaped, so that the load bearing capacity of the pivot point can be increased to meet the requirement of high load bearing.

What is claimed is:

1. A steering joint, configured to connect a bottom pipe and a support pipe, the steering joint comprising:
   a base, comprising a sleeve portion and a first pivot plate formed separately from one another, wherein the sleeve portion comprises a sleeve space which is opened downward and is configured to be sleeved with the bottom pipe, the first pivot plate is provided with a guide groove, and wherein the base further comprises a locking plate extending integrally from the sleeve portion, and the first pivot plate is fixed on the locking plate by a fixing bolt;
   a rotary base, comprising a clamp configured to clamp the support pipe and a second pivot plate which is provided with a through hole, wherein the first pivot plate and the second pivot plate are pivoted together at a pivot point, and when the first pivot plate and the second pivot plate rotate relatively, the through hole is kept to align to the guide groove; and
   a locking piece, penetrating through the through hole and the guide groove to clamp and fix the first pivot plate and the second pivot plate, so that the first pivot and the second pivot plate cannot rotate relatively.

2. The steering joint according to claim 1, wherein the rotary base comprises an insertion space provided for the support pipe being placed, the clamp comprises an arc plate which is adjacent to the insertion space and a tightening piece, the arc plate is pivoted to the rotary base through a latch, the tightening piece comprises a knob and a bolt, the bolt penetrates through the rotary base and the arc plate and screws to the knob, the rotary base comprises a recess for the bolt to press against and block the bolt from rotating, and the knob being able to rotate to press against the arc plate to transversely penetrate into the insertion space so that the arc plate clamps the support pipe.

3. The steering joint according to claim 2, further comprising a pipe bushing to provide a hardness which is configured to be lower than a hardness of the support pipe, and the insertion space is configured to receive the support pipe at an interval of the pipe bushing.

4. The steering joint according to claim 2, wherein a circular washer is provided between the knob and the arc plate.

5. The steering joint according to claim 1, wherein the second pivot plate is U-shaped to form a gap space, the first pivot plate is placed in the gap space, and the first pivot plate and the second pivot plate are pivoted together at the pivot point by locking a pivot screw and a pivot nut.

6. The steering joint according to claim 5, wherein the locking piece comprises a locking bolt and a slide screw nut, the slide screw nut is provided with a convex portion sliding on the guide groove, the slide screw nut is placed in the gap space to press against the first pivot plate, the locking bolt penetrates through the through hole and the guide groove to press against the second pivot plate, and the locking bolt is locked on the slide screw nut to clamp and fix the first pivot plate and the second pivot plate.

7. The steering joint according to claim 6, further comprising a rotary shifting lever to be fixed on the locking bolt.

8. The steering joint according to claim 6, wherein the locking bolt presses against the second pivot plate through a circular locking gasket.

\* \* \* \* \*